United States Patent
Pohl et al.

(10) Patent No.: US 8,763,372 B2
(45) Date of Patent: Jul. 1, 2014

(54) METHOD FOR HEATING A METERING VALVE IN AN SCR SYSTEM FOR THE EXHAUST GAS AFTERTREATMENT OF AN INTERNAL COMBUSTION ENGINE

(75) Inventors: Stephan Pohl, Schwieberdingen (DE); Jens Reinhold, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 900 days.

(21) Appl. No.: 12/881,452

(22) Filed: Sep. 14, 2010

(65) Prior Publication Data

US 2011/0062357 A1    Mar. 17, 2011

(30) Foreign Application Priority Data

Sep. 14, 2009  (DE) .......................... 10 2009 029 409

(51) Int. Cl.
*F01N 3/20* (2006.01)
(52) U.S. Cl.
USPC .............................................. 60/295; 60/301
(58) Field of Classification Search
USPC .................... 60/286, 295, 301, 303
See application file for complete search history.

(56) References Cited

U.S. PATENT DOCUMENTS

| | | | |
|---|---|---|---|
| 2008/0066455 A1 | 3/2008 | Viola | |
| 2008/0250774 A1 | 10/2008 | Solbrig | |
| 2009/0036268 A1* | 2/2009 | Olson | 477/98 |
| 2009/0036269 A1 | 2/2009 | Kim | |
| 2009/0185654 A1 | 7/2009 | Kang | |
| 2009/0301064 A1* | 12/2009 | Maier et al. | 60/286 |
| 2010/0031639 A1* | 2/2010 | Kwon | 60/286 |
| 2010/0064668 A1 | 3/2010 | Beckmann et al. | |
| 2010/0229532 A1* | 9/2010 | Ohno | 60/274 |

FOREIGN PATENT DOCUMENTS

| | | | |
|---|---|---|---|
| DE | 102007011686 | 9/2008 | |
| DE | 10 2007 017 458 | 10/2008 | |
| DE | 102008017543 | 10/2008 | |
| WO | WO2009/047954 | * 4/2009 | ............... F01N 3/08 |

* cited by examiner

*Primary Examiner* — Kenneth Bomberg
*Assistant Examiner* — Jonathan Matthias
(74) *Attorney, Agent, or Firm* — Kenyon & Kenyon LLP

(57) ABSTRACT

The present invention relates to a method for operating an electromagnetically controllable metering valve, which is disposed in an exhaust gas system of an internal combustion engine. For a metering of reducing agent in the exhaust gas system, the metering valve is actuated by a control and/or regulating device via an electromechanical drive unit with a first current profile, which includes a holding current phase having a first holding current level when said metering valve is open. Said metering valve and the drive unit are part of a metering module. When the internal combustion engine is switched off, said metering valve is actuated via said drive unit with a second current profile, which has a second holding current level that is increased with respect to the first holding current level. An independent claim relates to a control device set up to carry out the method.

8 Claims, 4 Drawing Sheets

METHOD FOR HEATING A METERING VALVE IN AN SCR SYSTEM FOR THE EXHAUST GAS AFTERTREATMENT OF AN INTERNAL COMBUSTION ENGINE

This application claims benefit of Ser. No. 10 2009 029 409.0, filed 14 Sep. 2009 in Germany and which application incorporated herein by reference. To the extent appropriate, a claim of priority is made to the above disclosed application.

BACKGROUND

In a so-called SCR exhaust gas aftertreatment system (selective catalytic reduction), a liquid reducing agent (normally a urea-water solution, particularly AdBlue) is injected when required into the exhaust gas tract of an internal combustion engine by means of a metering valve; thus enabling a catalytic reduction of nitrogen oxide to take place in an SCR catalytic converter. The urea thereby dissociates to ammonia ($NH_3$), which reacts with the nitrogen oxides ($NO_x$) and converts them into non-toxic water ($H_2O$) and nitrogen ($N_2$).

Electromagnetically controllable metering valves are used in this process, which are actuated by a drive unit. The drive unit includes a magnetic coil, whose magnetic field which is generated by a sufficiently large coil current lifts a valve element of the metering valve from a valve seat and in doing so opens the metering valve. A smaller coil current is necessary to subsequently stop the opened metering valve. The metering valve and the drive unit are thereby combined in a metering module.

It is known that an AdBlue volume expands by approximately 11% during freezing and can consequently cause damage to component parts. The metering valve is generally the most susceptible to damage because it includes very thin-walled and hence pressure sensitive components as, for example, a perforated injection disc. Perforated injection discs are, for example, currently used, which are only approximately 150 µm thick and are therefore particularly subject to compressive forces occurring during freezing.

It is therefore common to empty the metering valve during shutdown of the vehicle's engine, for example, by sucking back the reducing agent. The metering valve is emptied in order to prevent a possible freezing of said valve when frost occurs and also in order to remove the relatively aggressive urea-water solution from the interior of the metering module for reasons of protecting components.

It was determined in tests that a considerable residual amount of AdBlue stays in the metering module in the case of a back suction operation. This residual amount can cause damage upon freezing, a freezing direction being of importance in this case. If freezing occurs in the direction of the perforated injection disc, i.e., for example, emanating from the center of the metering module in the direction of said perforated injection disc, the volume enlargement of AdBlue due to cold also occurs in this direction. That means that said sensitive perforated injection disc is subjected to pressure which can damage the same.

A method for heating a metering module in a SCR exhaust gas aftertreatment system is known from the German patent publication DE 10 2007 017 458 A1, wherein a need for heating the metering module to avoid freezing is ascertained by the evaluation of sensor signals, in particular signals of a temperature sensor, and by their comparison with threshold values. In order to heat said metering module, the closed metering valve is actuated with a current profile, which does not yet lead to the opening of the metering valve and merely releases heat in the ohmic resistor of the coil, which heats up said metering module from the inside out. This current profile is thereby particularly characterized in that its level, i.e. its average amperage, is lower than the level of a first current profile used for metering AdBlue.

SUMMARY

The invention is in contrast characterized in that the metering valve is actuated with a second current profile upon switching off the internal combustion engine, which has a second holding current level that is increased with respect to a first holding current level which is characteristic for the first current profile.

The invention is based on using the emptying phase of the metering valve after switching off the internal combustion engine to heat up the metering module by means of a change in the electrical actuation, which takes place via the control and/or regulating device. The increased second current level employed according to the invention during vehicle operation or in a run-on phase after switching off said internal combustion engine results on the one hand in the current feed opening the metering valve for emptying the same and on the other hand in an amperage being available which releases sufficient heat in the ohmic resistor of the same coil to heat up the metering module from inside out.

A temperature increase within the metering module is thereby produced which is directed toward the coil and in so doing away from the sensitive perforated injection disc.

The temperature thereby increases in the direction of the coil. The region of the sensitive perforated injection disc will therefore be comparatively cooler than other regions of the metering module. If the AdBlue subsequently freezes due to correspondingly lower ambient temperatures, the freezing process will begin at the thinnest region of the metering module, i.e. at the perforated injection disc, so that a pressure balance advantageously occurs in a feed line. The freezing process then continues from the perforated injection disc in the direction of the pressure line, where there is enough space for the cold-related expansion of the reducing agent and for the pressure balance required as a result thereof.

In other words: the invention ensures that a non-critical freezing direction for sensitive components of the metering module is given preference.

In one embodiment, the method is carried out only in one instance, in which frost with lower temperatures than the freezing point of the reducing agent (at an AdBlue temperature of approximately −11 EC) is detected by evaluation of signals of a sensor device of the motor vehicle in the control and/or regulating device. The amount of the increased second holding current level is preferably several times, in particular approximately three times, larger than the first holding current level.

It is also preferred that the conditions for the following standing phase of the motor vehicle are checked upon switching off the internal combustion engine and that the method is then carried out if the check reveals a danger of freezing.

A structural change in the known standardized metering module is preferably not required for implementing the invention. The open-loop, respectively closed-loop, control of the metering module in the control and/or regulating device should only have to be changed. The behavior of the metering valve is not influenced with respect to the metering quantity during normal operation with the internal combustion engine running.

BRIEF DESCRIPTION OF THE DRAWINGS

An exemplary embodiment of the invention is subsequently described in detail using the figures. The following are shown.

DETAILED DESCRIPTION

Figure 1:
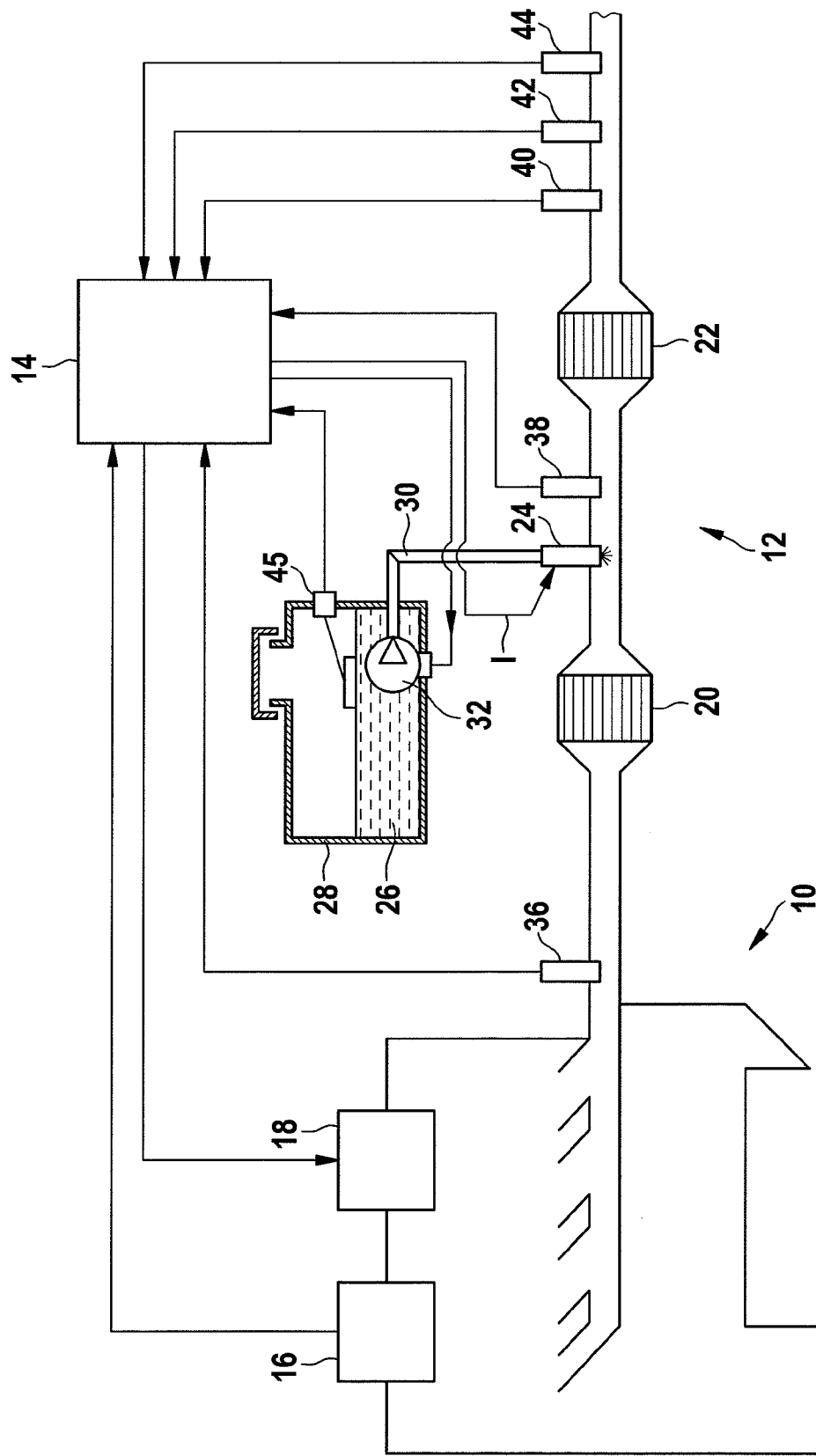
FIG. 1 the technical environment of the invention.

FIG. 1 shows the environment of the invention. FIG. 1 shows an internal combustion engine 10 comprising an exhaust gas system 12 and a control unit 14. The control unit 14 preferably relates to the control unit, which controls the internal combustion engine 10 and in so doing receives signals of a sensor system 16 concerning operating parameters of said internal combustion engine 10 and processes said signals to actuating variables for actuators 18 of said internal combustion engine 10. The signals of the sensor system 16 typically allow said control unit 14 to determine the air mass drawn in by said internal combustion engine 10, the position of the angle of rotation of a crankshaft of said internal combustion engine 10, a temperature of said internal combustion engine 10, etc. Said control unit 14 typically forms actuating variables for metering fuel into combustion chambers of said internal combustion engine 10, for setting a supercharging pressure of an exhaust gas turbo charger, for setting an exhaust gas return rate, etc.

The control unit 14 is furthermore set up for, in particular programmed for, controlling the course of events of at least one method and/or one embodiment of such a method.

The exhaust gas system 12 includes an oxidation catalytic converter 20 and an SCR catalytic converter 22. A metering module 24, via which the reducing agent 26 from a storage container 28 is injected into the exhaust gas, is disposed between the oxidation catalytic converter 20 and the SCR catalytic converter 22. The reducing agent 26 consists of a urea-water solution, particularly AdBlue. The metering module 24 is electromagnetically actuated and to this end by the control unit 14 via a control current I, which flows through a magnetic coil (not visible in FIG. 1) of said metering module 24. In so doing, said metering module 24 is supplied with reducing agent 26 via a feed line 30, which is supplied with reducing agent 26 by a pump 32. The pump 32 is preferably embodied as a double-acting pump, which during the pressure operation produces the necessary injection pressure for metering the reducing agent 26 into the exhaust gas system 12 and which during the suction operation allows the feed line 30 to be emptied of reducing agent 26. Said pump 32 is likewise controlled by said control unit 14 to meet this objective.

In addition, different sensors 36, 38, 40, 42, and 44, which acquire operating parameters of the exhaust gas system 12 and deliver corresponding data to the control unit 14, are provided for controlling the selective catalytic reduction of nitrogen oxides by means of a metering of reducing agent 26 to the exhaust gas system 12 of the internal combustion engine 10. The sensors 36 and 40 relate to temperature sensors in one embodiment, while the sensor 38 preferably serves to acquire the NOx concentration in the exhaust gas upstream of the SCR catalytic converter 22. Another NOx sensor 42 is disposed behind said SCR catalytic converter 22. The sensor 44 detects an ammonia concentration in the exhaust gas behind said SCR catalytic converter 22 and thus allows for the determination of an overdosage of reducing agent 26. A fill level sensor 45 acquires the reducing agent fill level in the storage container 28 and delivers a corresponding signal to the control unit 14.

Figure 2:
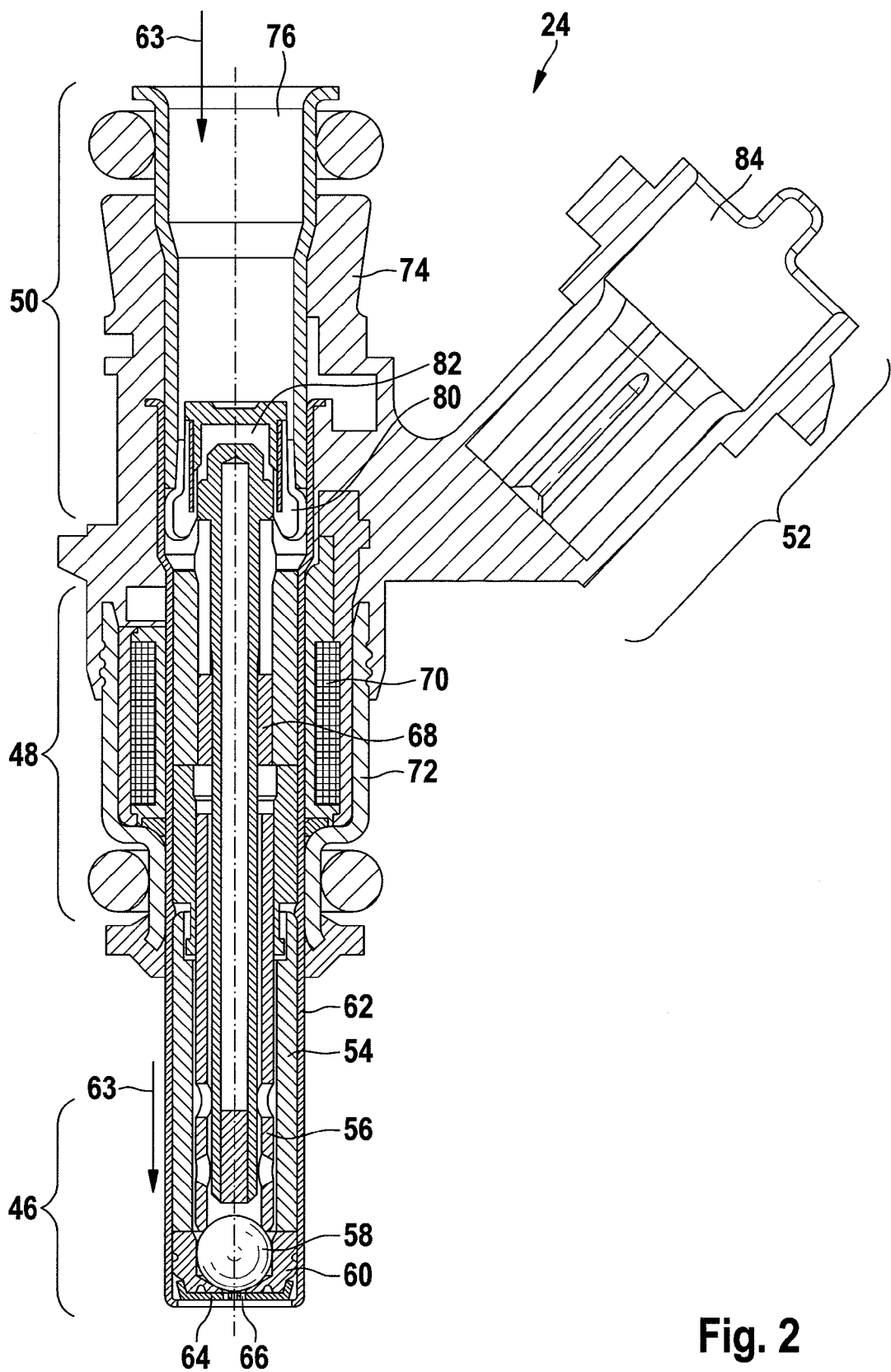
FIG. 2 a longitudinal section of the metering module from FIG. 1.

FIG. 2 shows in detail the metering module 24 in a longitudinal cross-sectional view. The metering module 24 essentially comprises a metering valve 46, an electromechanical drive unit 48, an hydraulic connection unit 50 for the reducing agent 26 to be metered and an electrical current feed unit 52.

The metering valve 46 has a sleeve-shaped first housing 54, in which a retaining body 56 is axially guided and the free end thereof is connected to a spherical valve element 58. The valve element 58 interacts with a valve seat 60. Within the retaining body 56, a guide tube 62 is guided centrally and axially as a feed line for the reducing agent 26. The guide tube 62 ends in the direction of flow 63 somewhat above the valve element 58. In FIG. 2, a perforated injection disc 64, which covers an orifice outlet 66 out of the metering module 24 for said reducing agent 26, is disposed beneath said valve element 58. The perforated injection disc 64 is approximately 150 μm thick and comprises openings for the discharge of said reducing agent 26 (not visible).

In FIG. 2, the drive unit 48 is disposed above the metering valve 46. The drive unit substantially comprises an armature 68 disposed in the extension of the retaining body 56, via which said retaining body 56 can be axially moved with the valve element 58. The armature 58 is moved by the magnetic force produced in a magnetic coil 70. The magnetic coil 70 thereby includes, e.g., an electrical resistor of approximately 12Ω. The drive unit 48 is enclosed by a second housing 72.

A third housing 74, which includes the hydraulic connection unit 50 for the reducing agent 26 to be metered and the electrical current feed unit 52, is fitted, respectively screwed, on the housing 72. Said hydraulic connection unit 50 has in the center a connecting channel 76 for said reducing agent 26 to be metered. The connecting channel 76 is hydraulically connected to the controllable double-acting pump 32 (not shown in FIG. 2). Said double-acting pump 32 delivers the reducing agent 26 into the connecting channel 76, where an element acting as a pressure valve 80 is disposed in the direction of flow 63. Said element then delivers said reducing agent 26 into the region of a guide tube opening 82. The electrical current feed unit 52 with a socket 84, which accommodates a connector having power supplying lines (not depicted) for the magnetic coil 70, is disposed laterally on the third housing 74.

Figure 3:
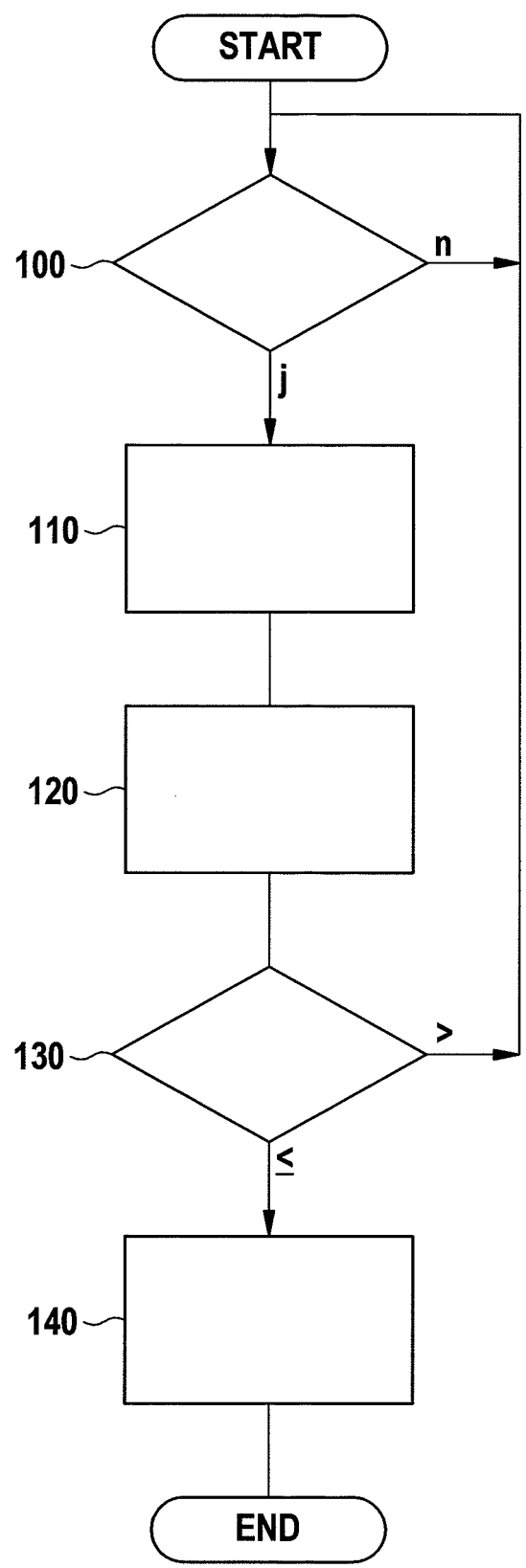
FIG. 3 a flow diagram of the sequence of the method.

FIG. 3 shows a flow diagram for the course of events of the method. In said method, a check is initially made in the query 100 to determine whether the internal combustion engine 10 was switched off, thus enabling a run-on phase of said internal combustion engine 10 to begin. If this is the case, the operation of the pump 32 is converted from a pressure mode to a suction mode in step 110. This is necessary because provision is made for the metering valve 46 to be emptied by a back suction operation. As is well known, a residual amount of reducing agent 26, however, remains in the metering valve 46. In order to support the suction mode, said metering valve 46 is opened in step 120 with the known method for operating said internal combustion engine 10.

Figure 4:
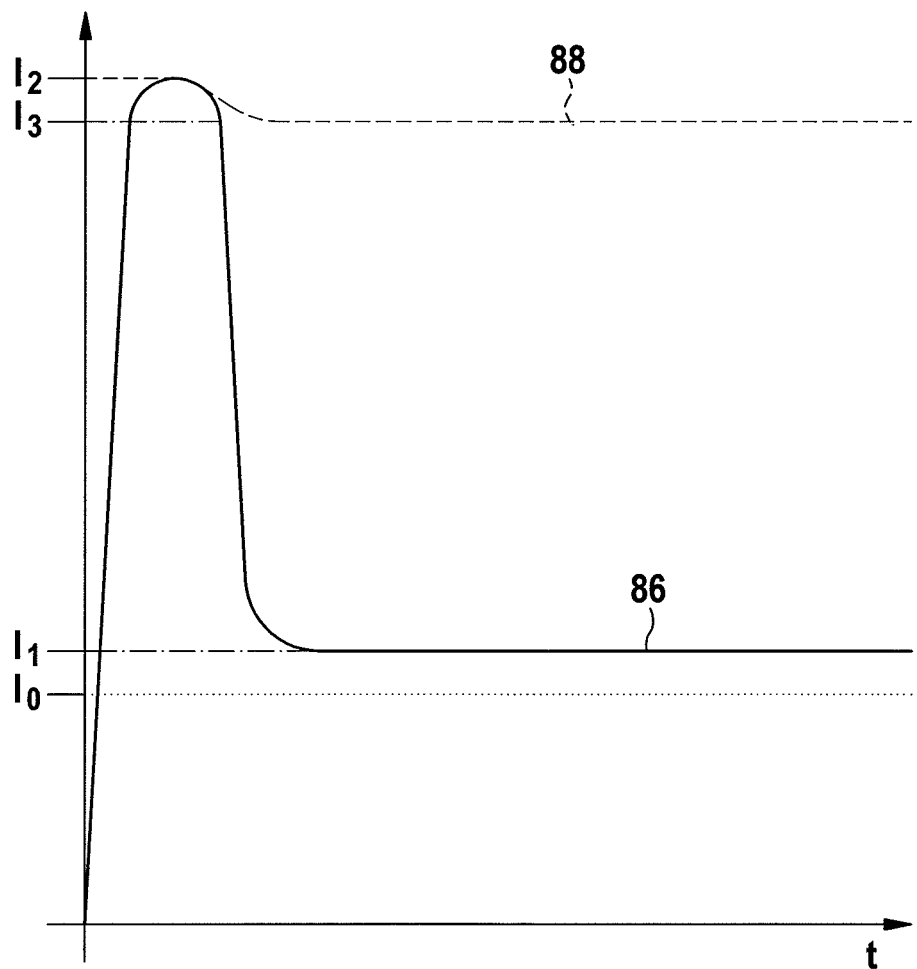
FIG. 4 a curve of the amount of amperes flowing in the magnetic coil of FIG. 2 during normal operation in the method according to the invention.

A current curve of the current flowing in the magnetic coil 70 is depicted in FIG. 4 for the sake of improved clarity. The current curve of the known method for operating the internal combustion engine 10 is depicted by a solid line 86. The current initially increases quickly to the amperage $I_2$ in order to open the metering valve 46 quickly. In so doing, a threshold value $I_0$ is exceeded, $I_0$ depicting a current level which is required to overcome frictional and inertia forces in order to open said metering valve 46. After opening said metering valve 46, the amperage to hold said metering valve 46 open can be reduced to the value $I_1$. The threshold value $I_0$ may, however, not be undershot.

After the metering valve 46 has been opened, signals of the temperature sensor 36 and/or 40 are evaluated in the control unit 14 in the query 130. If a temperature is ascertained there, at which a danger of freezing exists when the vehicle is in operation or when the internal combustion engine is switched off, the method according to the invention continues. In so doing, a freezing up of the metering valve 46 should subsequently be countered because when the reducing agent 26 freezes damage to the metering valve 46, in particular to the perforated injection disc 64, can be caused by the expansion of said reducing agent 26 resulting from the freezing. Said freezing is then particularly harmful if the freezing direction runs from the center of the metering module 24 to said perforated injection disc 64 and thereby pressure is exerted on said perforated injection disc 64. In order to counter this undesirable effect, the magnetic coil 70 is subsequently activated in step 140 with a holding current having an amperage of approximately 1000 mA (cf. $I_3$ in FIG. 4) for holding open said metering valve 46.

A dashed line 88 in FIG. 4 shows the current curve. In a preferred embodiment, this corresponds to approximately three times the value, which is necessary as a holding current (approximately 350 mA; cf. $I_1$ in FIG. 4) in the known method during the operation of the internal combustion engine 10. This means that the increased amperage holds the metering valve 46 open, but the increased amperage of the current through the magnetic coil 70 additionally causes a considerable heat input in the metering module 24. The heat input emanates from the region of the magnetic coil 70 disposed in said metering module 24, i.e. from approximately the center of said metering module 24, and hence heats up the entire metering module 24. Assuming a battery voltage of 12V, a heat output of approximately 12 W results for the holding process in the magnetic coil 70 during the run-on phase.

Thus, the freezing direction is influenced by a targeted heat input into the metering module 24.

A freezing process thus begins at the thinnest region of the metering module, i.e. at the orifice outlet 66 in the vicinity of the perforated injection disc 64, so that a pressure balance advantageously results toward the guide tube 62, i.e. away from said perforated injection disc 64, where there is enough space for the cold-related expansion of the reducing agent 26 and for the pressure balance required as a result thereof.

The invention claimed is:

1. A control device, comprising:
   an electromagnetically controllable metering valve disposed in an exhaust gas system of an internal combustion engine;
   the metering valve configured to meter a reducing agent in the exhaust gas system via an electromechanical drive unit;
   the control device in signal communication with the electromechanical drive unit;
   the control device configured to actuate the electromechanical drive unit with a first current profile which includes a first holding current level when the metering valve is open;
   the control device configured to actuate the drive unit with a second current profile when the internal combustion engine is switched off, where the second current profile has a second holding current level that is increased with respect to the first holding current level; and
   a metering module comprising the metering valve and the drive unit; and
   the control device configured to heat up the metering module by initiating the second current profile.

2. A method for operating an electromagnetically controllable metering valve, comprising:
   actuating an electromechanical drive unit with a first current profile that includes a holding current phase including a first holding current level when the electromagnetically controllable metering valve is open,
   wherein the electromagnetically controllable metering valve is disposed in an exhaust gas system of an internal combustion engine and actuated by means of a control device, the control device being in signal communication with the electromechanical drive unit for a metering of a reducing agent in the exhaust gas system,
   wherein a metering module comprises the metering valve and the drive unit;
   actuating the drive unit with a second current profile when the internal combustion engine is switched off, the second current profile including a second holding current level that is increased with respect to the first holding current level; and
   heating the metering module by initiating the second current profile.

3. The method according to claim 2, wherein the increased second holding current level is only produced when the danger of frost exists.

4. The method according to claim 2, wherein the second current profile opens the metering valve for the purpose of emptying the same.

5. The method according to claim 4, wherein the metering valve is emptied by means of back suction.

6. The method according to claim 2, wherein the increased second holding current level is three times larger than the first holding current level.

7. The method according to claim 2, wherein the electromagnetically controllable metering valve is actuated by an energized electromagnetic coil disposed in the electromechanical drive unit.

8. The method according to claim 2, wherein the metering module is heated up by the energized electromagnetic coil.

* * * * *